No. 844,354. PATENTED FEB. 19, 1907.
A. HAWKINSON.
PULLING BOX FOR CONDUITS.
APPLICATION FILED DEC. 11, 1905.
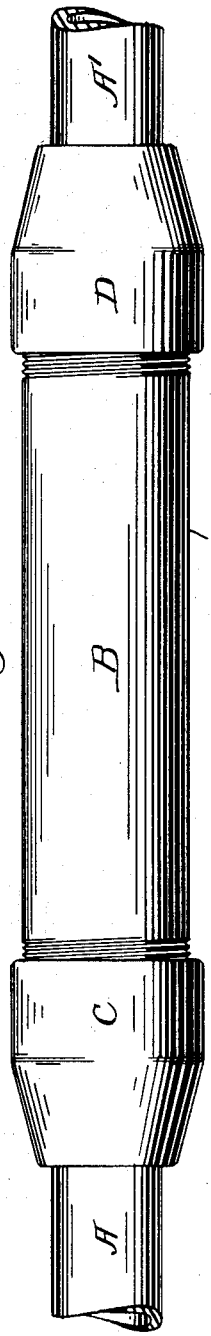
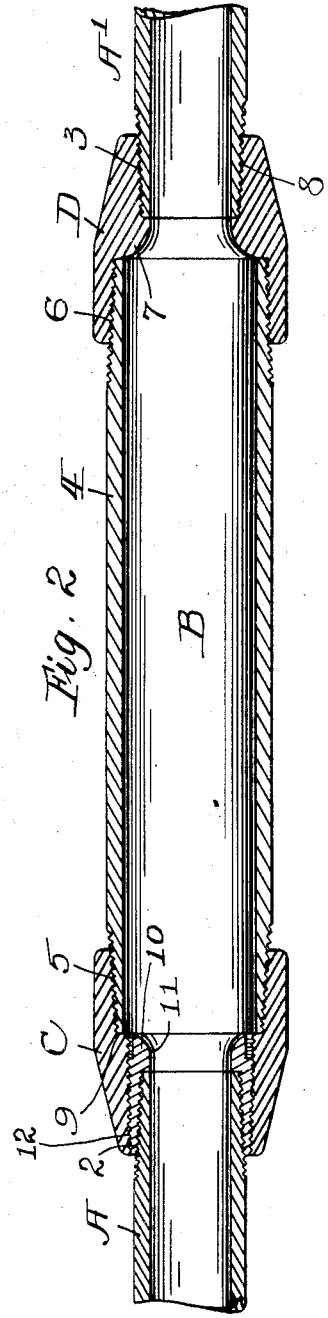
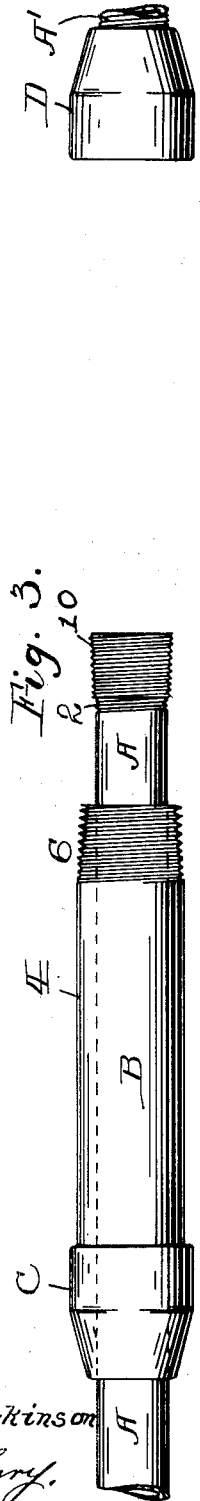
Witnesses:
E. M. Boisel.
F. H. Hansen.
Inventor:
Andrew Hawkinson
by: F. G. Bradbury.
Attorney.

UNITED STATES PATENT OFFICE.

ANDREW HAWKINSON, OF ST. PAUL, MINNESOTA.

PULLING-BOX FOR CONDUITS.

No. 844,354.　　　Specification of Letters Patent.　　　Patented Feb. 19, 1907.

Application filed December 11, 1905. Serial No. 291,227.

*To all whom it may concern:*

Be it known that I, ANDREW HAWKINSON, a citizen of the United States, residing at St. Paul, in the county of Ramsey and State of Minnesota, have invented a new and useful Pulling-Box for Conduits, of which the following is a specification.

My invention relates to an improved pulling-box for electric conduits, and has for its object to provide means by which a conduit may be opened for testing, repairing, or pulling electrical conductors through the same.

Further objects are to provide a separable joint which is simple in construction, can be easily opened or closed without abrading the electrical conductors therein, and is air-tight when closed.

To these ends my invention consists, in combination with a conduit having an opening, of a union or cover adapted to pass freely over said opening and provided with means by which it is adapted to close and seal said conduit.

In the accompanying drawings, forming part of this specification, Figure 1 is a side view of my invention. Fig. 2 is a longitudinal section; and Fig. 3 is another side view, on a reduced scale, showing the pulling-box open.

In the drawings, A A′ represent the adjacent ends of a conduit spaced apart and adapted to receive conductors used for power, telephone, signaling, or other electrical purposes for which conduits of this character are commonly employed. These ends are tapered toward each other and provided with threads 2 and 3.

B represents a pulling-box which has a union or cover 4 of larger internal diameter than the external diameter of the conduit and is adapted to pass freely over the end A when the pulling-box is opened. The union 4 is tapered toward its ends at 5 and 6 and provided with threads for the purpose of holding reducers C and D, each of which has a corresponding internal thread which unites with the threaded ends of the union.

The reducer D is provided with a shoulder 7, which is rounded to prevent abrasion of the wires in the conduit and impinges between the end A′ of the conduit and the adjacent end of the union 4. This reducer is also provided with an internal thread 8, which meshes with the threaded end A′ when the pulling-box is closed.

The reducer C is threaded securely upon the opposite end of the union and is provided with a shoulder 9, which impinges against the union. Between the reducer C and the end of the conduit is a bushing 10, which is formed with internal threads. These threads mesh with the threads on the end of the conduit. A shoulder 11, formed on the bushing, impinges against the end of the conduit and is rounded outwardly to prevent abrasion of the wires when pulled therethrough. The outer surface of the bushing 10 tapers back over the end A of the conduit and receives a corresponding internal thread 12 on the reducer C.

All of the threads on the parts above described are preferably right hand.

In use the reducers are secured upon the ends of the union and, with the union, are slipped back over the end A of the conduit. The bushing 10 is then secured upon the end A, as shown in the drawings. After the wires have been pulled through the conduit and their ends joined together or whenever it is desired to close the conduit the union 4 is passed forward and its reducer C and free end screwed tightly, respectively, upon the bushing 10 and the reducer D of the conduit.

The size and shape of the union may be varied, and it is obvious that the construction of the parts of this invention may be varied without departing from the spirit thereof, and I do not wish to confine myself to the exact construction described.

Having described my invention, what I claim as new, and desire to protect by Letters Patent, is—

1. A device of the class set forth, comprising, in combination with the adjacent ends of an open conduit, a bushing on one of said ends, and a cover between said ends provided with reducers which are adapted to connect with said bushing and the opposite end of said conduit, said bushing and opposite end of said conduit being tapered in the same direction to permit said cover to pass over the conduit.

2. A device of the class set forth, comprising, in combination with the adjoining ends of a conduit spaced apart, a union between said ends adapted to pass over said conduit, a bushing on one of said ends, and a reducer carried on each end of said union, one reducer being threaded upon said bushing and the other reducer threaded upon the opposite end of the conduit, the threads between all of the parts being right hand and the joints between the reducers and the bushing and said opposite end of the conduit being tapered in the same direction, for the purposes specified.

In testimony whereof I have signed my name to this specification in the presence of two subscribing witnesses.

ANDREW HAWKINSON.

Witnesses:
E. M. BOESEL,
F. G. BRADBURY.